(12) United States Patent
Hiratsuka (10) Patent No.: US 12,386,941 B2
(45) Date of Patent: Aug. 12, 2025

(54) INFORMATION PROCESSING METHOD AND RECORDING MEDIUM

(71) Applicant: SONY GROUP CORPORATION, Tokyo (JP)

(72) Inventor: Yosuke Hiratsuka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 622 days.

(21) Appl. No.: 17/642,112

(22) PCT Filed: Sep. 4, 2020

(86) PCT No.: PCT/JP2020/033552
§ 371 (c)(1),
(2) Date: Oct. 11, 2022

(87) PCT Pub. No.: WO2021/054145
PCT Pub. Date: Mar. 25, 2021

(65) Prior Publication Data
US 2023/0069648 A1    Mar. 2, 2023

(30) Foreign Application Priority Data
Sep. 19, 2019    (JP) ................................. 2019-170117

(51) Int. Cl.
*G06F 21/00*    (2013.01)
*G06F 21/10*    (2013.01)
*G06F 21/44*    (2013.01)

(52) U.S. Cl.
CPC .............. *G06F 21/44* (2013.01); *G06F 21/10* (2013.01)

(58) Field of Classification Search
CPC .................................. G06F 21/10; G06F 21/44
See application file for complete search history.

(56) References Cited

U.S. PATENT DOCUMENTS

2004/0111613 A1\*  6/2004  Shen-Orr .............. G06F 21/101
                                                          713/165
2004/0127196 A1    7/2004  Dabbish
                         (Continued)

FOREIGN PATENT DOCUMENTS

CN    104067626 A    9/2014
JP    11-031130 A    2/1999
                    (Continued)

OTHER PUBLICATIONS

See the foreign reference (translated in English). (Year: 2008).\*
(Continued)

*Primary Examiner* — Rodman Alexander Mahmoudi
(74) *Attorney, Agent, or Firm* — CHIP LAW GROUP (57) ABSTRACT

The present technology relates to an information processing method and a recording medium, each of which allows unauthorized use of a function activated by a license to be inhibited. A first program causes a computer to execute the function activated by the license; and a second program executes license authentication in response to an instruction from the first program, at least one part of the second program obfuscated, executes one part of the function in a case where the license is valid, and causes the computer to execute processing in which an execution result of the one part of the function is outputted to the first program. The present technology can be applied to, for example, an application program activated by the license.

10 Claims, 6 Drawing Sheets

(56) References Cited

U.S. PATENT DOCUMENTS

| | | | |
|---|---|---|---|
| 2006/0116966 A1* | 6/2006 | Pedersen | G06F 21/10 |
| | | | 705/59 |
| 2008/0301771 A1* | 12/2008 | Kawai | G06F 21/125 |
| | | | 726/2 |
| 2011/0197077 A1 | 8/2011 | Chan | |
| 2013/0151861 A1* | 6/2013 | Gan | G06F 21/10 |
| | | | 713/189 |
| 2014/0359655 A1 | 12/2014 | Diehl | |
| 2020/0264805 A1* | 8/2020 | Yoshii | G06F 3/065 |

FOREIGN PATENT DOCUMENTS

| | | | |
|---|---|---|---|
| JP | 2008-299776 A | | 12/2008 |
| JP | 2008547088 A | * | 12/2008 |
| JP | 2015-512073 A | | 4/2015 |
| JP | 2018-180854 A | | 11/2018 |
| KR | 10-2014-0125355 A | | 10/2014 |
| WO | 2013/107710 A2 | | 7/2013 |

OTHER PUBLICATIONS

International Search Report and Written Opinion of PCT Application No. PCT/JP2020/033552, issued on Nov. 10, 2020, 08 pages of ISRWO.

* cited by examiner

```
Dump of file License_check.dll
File Type: DLL
  Section contains the following exports for LICENSE_CHECK.dll 00000000 characteristics
  5789884E time date stamp Sat Jul 16 10:05:18 2016
      0.00 version
         1 ordinal base
         6 number of functions
         5 number of names ordinal hint RVA          name
         4    0 00009730 ChkLicense
         3    1 00009240 GetLicenseList
         1    2 0000B0C0 execute4kConvertPart
         6    3 000098B0 executeCcuConnectionPart
         5    4 00009860 executeSoundFrequencyConvertPart Summary
```

IN A CASE WHERE A FUNCTION TO EXECUTE A FARE-PAYING FUNCTION IS INCLUDED IN DLL FOR LICENSE PROCESSING, IT IS HIGHLY LIKELY THAT INFRINGEMENT IS MADE

INFORMATION PROCESSING METHOD AND RECORDING MEDIUM

CROSS REFERENCE TO RELATED APPLICATIONS

This application is a U.S. National Phase of International Patent Application No. PCT/JP2020/033552 filed on Sep. 4, 2020, which claims priority benefit of Japanese Patent Application No. JP 2019-170117 filed in the Japan Patent Office on Sep. 19, 2019. Each of the above-referenced applications is hereby incorporated herein by reference in its entirety.

TECHNICAL FIELD

The present technology relates to an information processing method and a recording medium and, in particular, to an information processing method and a recording medium, each of which inhibits unauthorized use of a function which is activated by a license.

BACKGROUND ART

Conventionally, there have been proposed technologies, each of which provides a user with a common key used for decrypting an application program (hereinafter, simply referred to as an application) which provides a function activated by a license, the common key obfuscated by using pieces of information pertinent to a user name and an expiration date (for example, refer to Patent Document 1).

CITATION LIST

Patent Document

Patent Document 1: Japanese Patent Application Laid-Open No. 2018-180854

SUMMARY OF THE INVENTION

Problems to be Solved by the Invention

However, in the invention disclosed in Patent Document 1, it is likely that the above-mentioned function is used in an unauthorized manner by falsification or the like of the application after decryption.

In view of the above-described circumstances, the present technology has been devised, and the present technology allows an unauthorized use of a function activated by a license to be inhibited.

Solutions to Problems

An information processing method of a first aspect of the present technology includes: a first program causing a computer to execute a function activated by a license; and a second program executing license authentication in response to an instruction from the first program, at least one part of the second program obfuscated, the second program executing one part of the function in a case where the license is valid, and the second program causing the computer to execute processing in which an execution result of the one part of the function is outputted to the first program.

A recording medium of a second aspect of the present technology has stored therein a program which includes: a first program which causes a computer to execute a function activated by a license; and a second program which executes license authentication in response to an instruction from the first program, at least one part of the second program obfuscated, executes one part of the function in a case where the license is valid, and causes the computer to execute processing in which an execution result of the one part of the function is outputted to the first program.

In the first aspect or the second aspect of the present technology, by the first program, the function activated by the license is executed by the computer; and by the second program whose at least one part is obfuscated, the license authentication is executed by the instruction from the first program, one part of the function is executed in a case where the license is valid, and the processing, in which the execution result of the one part of the function is outputted to the first program, is executed by the computer.

MODE FOR CARRYING OUT THE INVENTION

Hereinafter, embodiments for carrying out the present technology will be described. The description will be given in the following order.
1. Problematic Points Relating to Countermeasures of Unauthorized Use of Fare-Paying Function
2. First Embodiment
3. Second Embodiment
4. Example of Infringement Detection Method of The Present Technology
5. Modified Examples
6. Others

1. PROBLEMATIC POINTS RELATING TO COUNTERMEASURES OF UNAUTHORIZED USE OF FARE-PAYING FUNCTION

First, problematic points relating to countermeasures of an unauthorized use of a fare-paying function activated by a license will be described.

First, one example of activation processing of the fare-paying function will be briefly described.

For example, a server includes an installation key used to install the license for activating the fare-paying function and transmits a signature, which is generated by using a secret key, to a personal computer (PC).

The PC verifies the signature by using a public key which is paired with the secret key and in a case where the verification is successful, the license is installed by using the installation key. Then, a case where the license is valid, execution of an application which realizes the fare-paying function is enabled, the PC executes the application, thereby allowing a user to use the fare-paying function.

Note that the case where the license is valid is, for example, a case where a license which is legitimate and is within an expiration date is installed in the PC. On the other hand, a case where the license is invalid is, for example, a case where the license which is legitimate and is within the expiration date is not installed in the PC. More specifically, for example, the case where the license is invalid is a case where a license is not installed, a case where an installed license is not legitimate, a case where an expiration date of a license is expired, or the like.

Here, for example, the public key is falsified to a key of an attacker, and the application is made executable by a counterfeit license, whereby it is likely that the fare-paying function is used in an unauthorized manner.

In addition, for example, the application is falsified such that a function of license authentication is invalidated, and even in a state in which the license is invalid, the application is made executable, whereby it is likely that the fare-paying function is used in the unauthorized manner.

In order to counter this, for example, it is considered that the application is obfuscated and protected. The obfuscation of the application is to process a code of the application such that a human being can hardly understand the code.

Here, as programming languages used for developing applications, there are a machine language type language, an intermediate language type language, a script language, and the like.

The machine language type language is, for example, a programming language distributed in a state in which an application is converted to a machine language. As typical examples of the machine language type language, a C programming language, C++, Objective C, Delphi, and the like are cited.

In case where the machine language type language is used to develop an application, since a distributed application is described in the machine language, advanced obfuscation can be made.

The intermediate language type language is, for example, a programming language which is distributed in a state in which an application is converted to an intermediate language and is converted to the machine language upon execution. As typical examples of the intermediate language type language, Java (a registered trademark), C#, and the like are cited.

In a case where the intermediate language type language is used to develop an application, ordinarily, the application is distributed in a format in which the application is easily converted to the machine language. Therefore, the advanced obfuscation is difficult.

The script language is a simplified collective term of programming languages, and large parts thereof are interpreter type languages. As typical examples of the script language, JavaScript (a registered trademark), Python, and the like are cited.

In a case where the script language is used to develop an application, in consideration of specifications of the script language, the advanced obfuscation is difficult.

As described above, depending on the programming languages used to develop the application, differences in levels of obfuscation, which the programming languages can cope with, arise.

In addition, when the whole application is tried to be obfuscated, used programming languages are limited, or it is required for all of developers to learn techniques and rules of the obfuscation and to engage in work of the obfuscation. Therefore, a burden on the developers increases and a developing efficiency decreases. In addition, since extra codes are added to the whole application, it is likely that an execution speed is drastically reduced.

Figure 1:
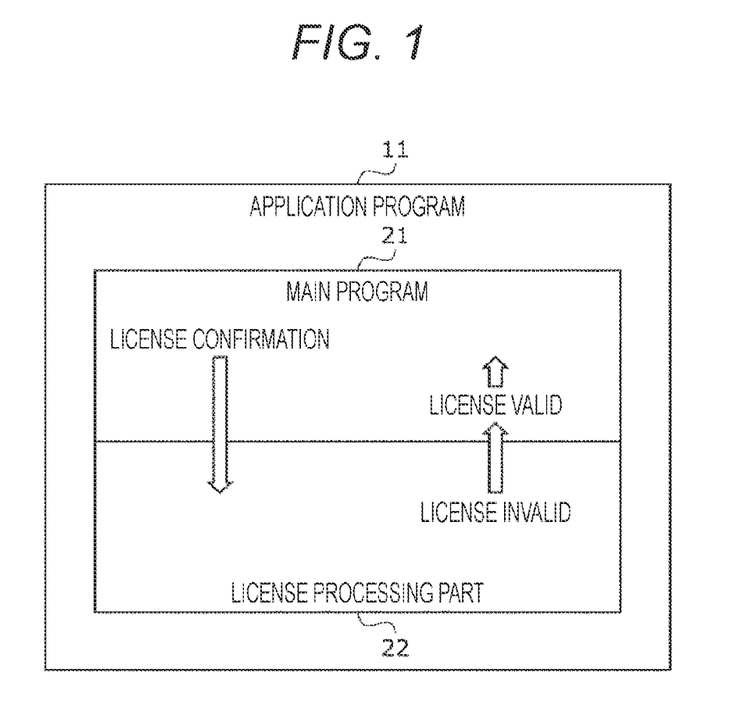
FIG. 1 is a diagram showing a configuration example of an application program.

In order to counter this, for example, as shown in FIG. 1, it is considered that an application program 11 is divided into a main program 21 and a license processing part 22 and only the license processing part 22 is obfuscated.

In response to an instruction issued by the main program 21, the license processing part 22 performs license authentication, and outputs, to the main program 21, an authentication result indicating whether or not a license is valid.

In a case where the license is valid, the main program 21 permits execution of the fare-paying function by the PC. On the other hand, in a case where the license is invalid, the main program 21 forbids the execution of the fare-paying function by the PC.

In this case, since the license processing part 22 is a small-scale program, the above-mentioned reduction in the developing efficiency and the execution speed is inhibited.

However, in this case, for example, when in an interface part with the license processing part 22 of the main program 21, falsification in which the authentication result of the license is rewritten so as to make the authentication result thereof invariably valid is performed, regardless of the invalid license, it is likely that the fare-paying function is used in the unauthorized manner.

2. FIRST EMBODIMENT

Next, with reference to FIGS. 2 to 4, a first embodiment of the present technology will be described.

<Configuration Example of Information Processing System 101>

Figure 2:
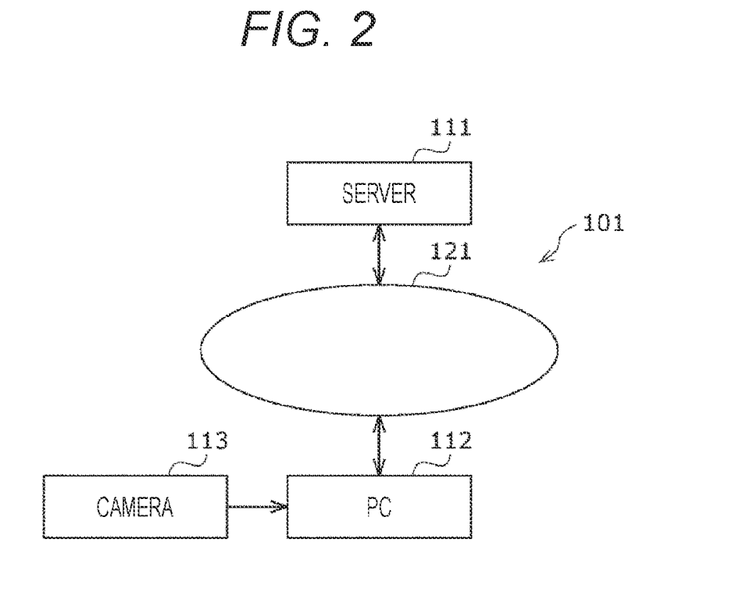
FIG. 2 is a block diagram illustrating an information processing system, according to a first embodiment, to which the present technology is applied.

FIG. 2 illustrates a configuration example of an information processing system 101 to which the present technology is applied.

The information processing system 101 includes a server 111, a PC 112, a camera 113, and a network 121. The server 111 and the PC 112 are connected with each other via the network 121 and communicate with each other.

The server 111 issues a license of a fare-paying function executed on the PC 112 and transmits, to the PC 112, license information for installing the issued license via the network 121.

Note that a method for providing the license from the server 111 to the PC 112 does not particularly matter as long as the method can safely provide the license.

The PC 112 installs the license provided from the server 111 and thereafter, executes a predetermined application, thereby executing a predetermined fare-paying function. For example, the PC 113 converts a high-definition (HD) image data supplied from the camera 113 to a 4K-image data and executes a function to perform editing and the like.

The camera 113 supplies, to the PC 112, the HD-image data obtained as a result of imaging.

<Configuration Example of PC 112>

Figure 3:
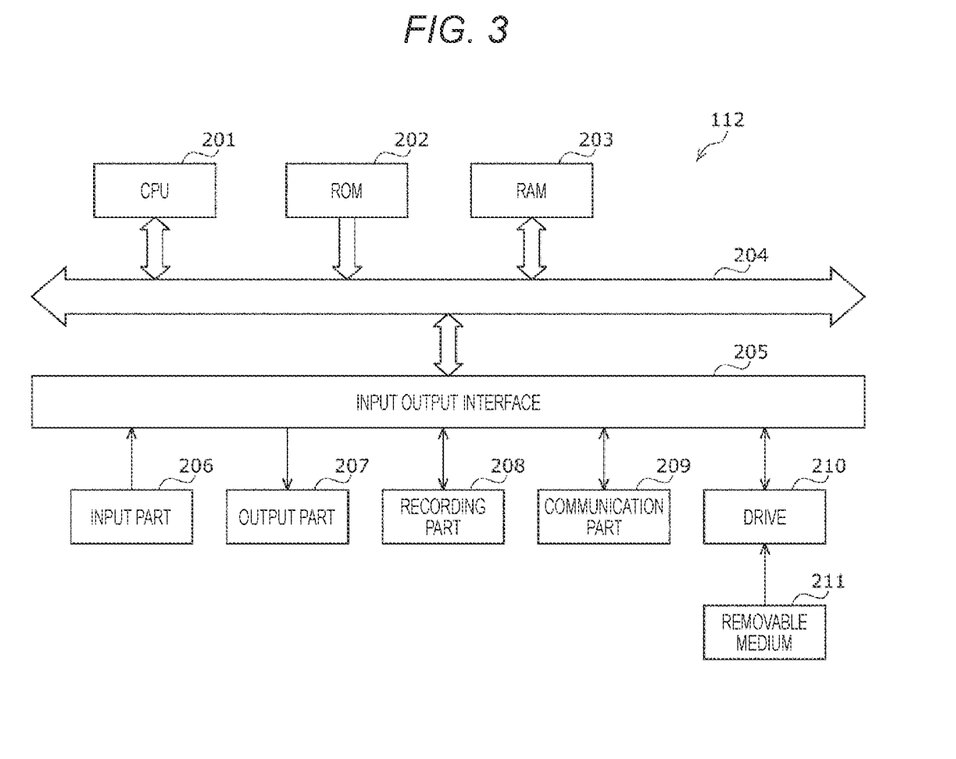
FIG. 3 is a diagram showing a configuration example of a PC.

FIG. 3 is a block diagram illustrating a configuration example of the PC 112.

In the PC 112, a central processing unit (CPU) 201, a read only memory (ROM) 202, and a random access memory (RAM) 203 are mutually connected by a bus 204.

Further connected to the bus 204 is an input output interface 205. Connected to the input output interface 205 are an input part 206, an output part 207, a recording part 208, a communication part 209, and a drive 210.

The input part 206 includes an input switch, buttons, an image sensor, and the like.

The output part 207 includes a display, a loudspeaker, and the like.

The recording part 208 includes a hard disk, a non-volatile memory, and the like.

The communication part 209 includes a network interface and the like.

The drive 210 drives a magnetic disk, an optical disk, a magneto optical disk, or a removable medium 211 such as a semiconductor memory.

In the PC 112 configured as described above, the CPU 201 loads, for example, a program recorded in the recording part 208 (for example, an application which realizes a fare-paying function) via the input output interface 205 and the bus 204 to the RAM 203 and executes the program, thereby performing a series of processes.

The program which the PC 112 (CPU 201) executes can be provided, for example, by recording the program in the removable medium 211 as a package medium or the like. In addition, the program can be provided via a wired or wireless transmission medium such as a local area network, the Internet, and digital satellite broadcasting.

In the PC 112, the program can be installed in the recording part 208 via the input output interface 205 by mounting the removable medium 211 to the drive 210. In addition, the program can be received by the communication part 209 via the wired or wireless transmission medium and be installed in the recording part 208. Besides, the program can be previously installed in the ROM 202 or the recording part 208.

<Configuration Example of Application Program>

Figure 4:
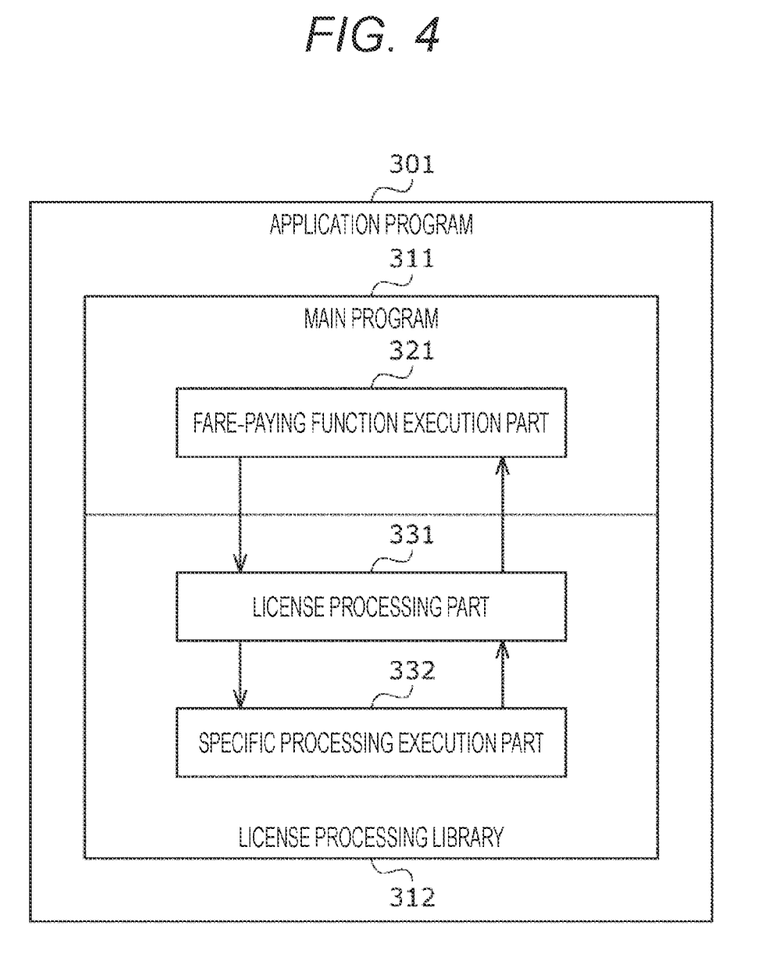
FIG. 4 is a diagram showing a configuration example of an application program to which the present technology is applied.

FIG. 4 is a diagram showing a configuration example of an application program 301 (hereinafter, simply referred to as an application 301) which realizes the fare-paying function when the application 301 is executed by the CPU 201 of the PC 112. The fare-paying function is, for example, a function with which the image data in the HD is converted to the 4K-image data and editing is performed.

The application 301 includes a main program 311 and a license processing library 312.

The main program 311 is a program which realizes the fare-paying function and includes a fare-paying function execution part 321. The fare-paying function execution part 321 is a program which causes the CPU 201 to execute the fare-paying function and is, for example, a predetermined function.

The license processing library 312 is a library which includes programs which realize a license authentication function of the fare-paying function and one part of the fare-paying function (hereinafter, referred to as specific processing). The specific processing is, for example, processing in which the image data in the HD is converted to the 4K-image data. The license processing library 312 includes a license processing part 331 and a specific processing execution part 332.

The license processing part 331 is a program which causes the CPU 201 to execute license authentication of the fare-paying function and is, for example, a predetermined function. The license processing part 331 is executed by an instruction of the fare-paying function execution part 321 and outputs an authentication result of the license to the fare-paying function execution part 321. In addition, the license processing part 331 instructs the specific processing execution part 332 to execute the specific processing as needed, obtains an execution result of the specific processing from the specific processing execution part 332, and outputs the execution result of the specific processing to the fare-paying function execution part 321.

The specific processing execution part 332 is a program which causes the CPU 201 to execute the specific processing and is, for example, a predetermined function. The specific processing execution part 332 is executed by an instruction of the fare-paying function execution part 321 and outputs an execution result of the specific processing to the license processing part 331.

The license processing part 331 and the specific processing execution part 332 are obfuscated in order to prevent the unauthorized use of the fare-paying function. Accordingly, it is preferable that the license processing part 331 and the specific processing execution part 332 are developed in the machine language type language and are described in the machine language.

Note that if the license processing part 331 and the specific processing execution part 332 in a stage of the machine language are obfuscated, the license processing part 331 and the specific processing execution part 332 may be obfuscated before being converted to the machine language or may be obfuscated after being converted to the machine language. In addition, for example, the obfuscation may be manually conducted by a developer or the obfuscation may be automatically conducted by using software of the obfuscation or the like.

On the other hand, the main program 311 is not obfuscated. Accordingly, a kind of a programming language used to develop the main program 311 and a language in which the main program 311 is described have little limitation, as compared with those of the license processing part 331 and the specific processing execution part 332.

<Specific Processing Execution Processing>

Figure 5:
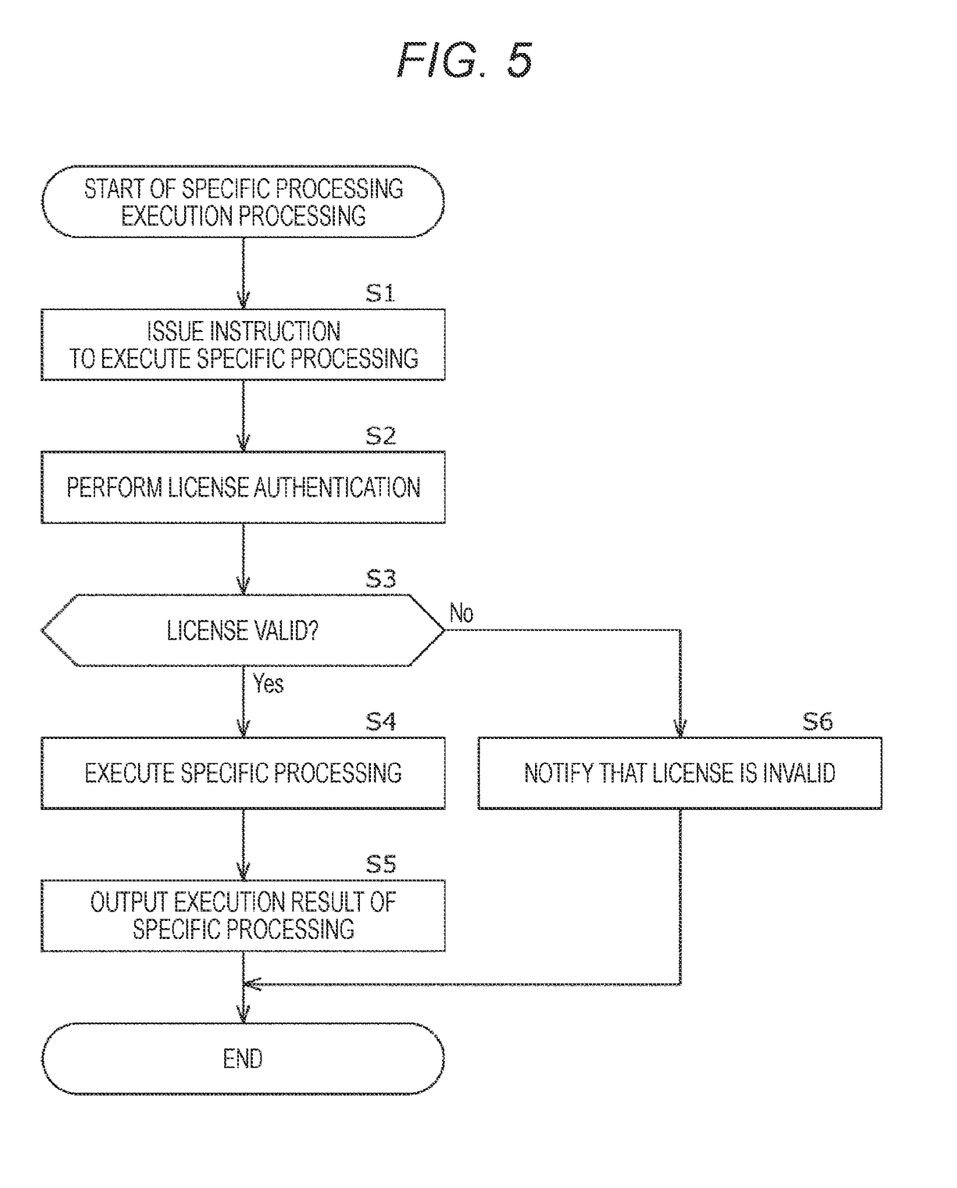
FIG. 5 is a flowchart for explaining specific processing execution processing.

Next, with reference to a flowchart in FIG. 5, specific processing execution processing realized when the PC 12 executes the application 301 will be described.

Note that in the description given below, although in reality, the CPU 201 which executes the application 301 executes various processes, in order to facilitate the description, it is described that parts of the application 301 (for example, the fare-paying function execution part 321) execute the various processes.

In step S1, the fare-paying function execution part 321 issues an instruction to execute the specific processing. For example, by invoking the license processing part 331, the fare-paying function execution part 321 instructs the license processing part 331 to execute the specific processing.

In step S2, the license processing part 331 performs license authentication. In other words, the license processing part 331 confirms whether or not the license of the fare-paying function is valid.

In step S3, on the basis of a result of the processing in step S2, the license processing part 331 determines whether or not the license is valid. In a case where the license is determined to be valid, the processing proceeds to step S4.

In step S4, the specific processing execution part 332 executes the specific processing. For example, by invoking the specific processing execution part 332, the license processing part 331 instructs the specific processing execution part 332 to execute the specific processing. The specific processing execution part 332 executes the specific processing.

In step S5, the license processing part 331 outputs an execution result of the specific processing. Specifically, the specific processing execution part 332 returns the execution result of the specific processing to the license processing part 331 (outputs the execution result thereof to the license processing part 331).

The license processing part 331 returns the execution result of the specific processing obtained from the specific processing execution part 332 to the fare-paying function execution part 321 (outputs the execution result thereof to the fare-paying function execution part 321). Note that at this time, the license processing part 331 may also returns the authentication result of the license together therewith to the fare-paying function execution part 321.

Thereafter, the specific processing execution processing is finished.

On the other hand, in step S3, in a case where the license is determined to be invalid, the processing proceeds to step S6.

In step S6, the license processing part 331 notifies that the license is invalid. Specifically, the license processing part 331 returns, to the fare-paying function execution part 321, an authentication result indicating that the license is invalid, thereby notifying that the license is invalid.

Note that for example, the license processing part 331 may notify an execution error of the specific processing or the like, instead of notifying that the license is invalid.

Thereafter, the specific processing execution processing is finished.

As described above, the unauthorized use of the fare-paying function in spite of the license being invalid is inhibited.

In other words, since the license processing part 331 and the fare-paying function execution part 321 are obfuscated, falsification in such a way as to allow the specific processing to be executed in a state in which the license is invalid is difficult.

In addition, for example, as described above with reference to FIG. 1, even if the authentication result of the license outputted from the license processing part 331 is falsified, the execution result of the specific processing cannot be obtained. As a result, the fare-paying function does not normally operate.

For example, in the above-described example, the image data in which the image data in the HD is converted to the 4K-image data cannot be obtained, and editing of the 4K-image data or the like cannot be performed.

Furthermore, since only one part of the application program 11 is obfuscated, it is made possible to inhibit the above-described developing efficiency and execution speed from being reduced.

3. SECOND EMBODIMENT

Next, with reference to FIG. 6, a second embodiment of the present technology will be described.
<Configuration Example of Information Processing System 401>

Figure 6:
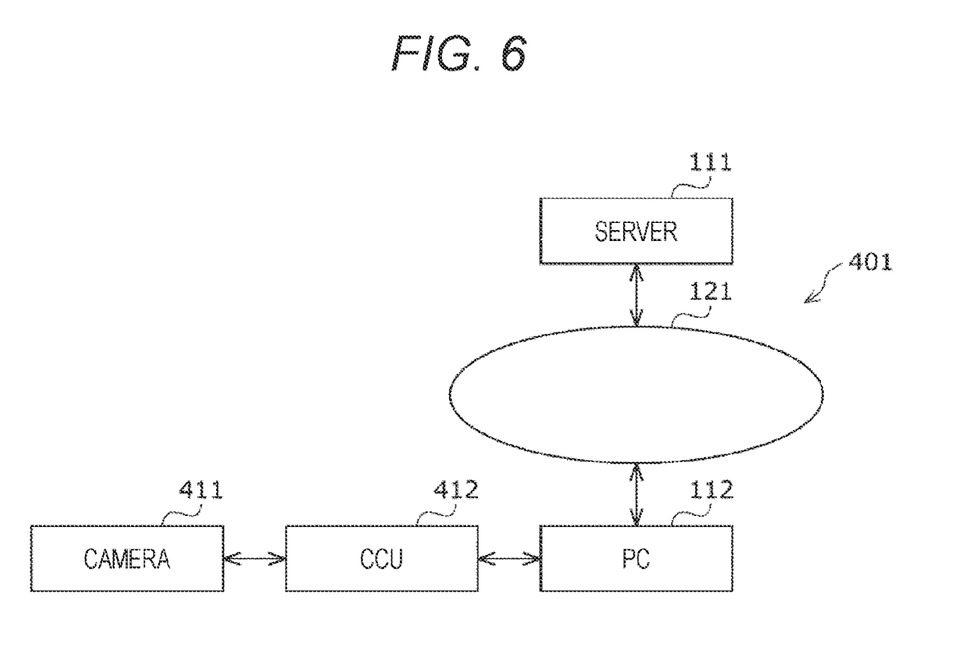
FIG. 6 is a block diagram illustrating an information processing system, according to a second embodiment, to which the present technology is applied.

FIG. 6 illustrates a configuration example of an information processing system 401 to which the present technology is applied. Note that in FIG. 6, parts corresponding to those of the information processing system 101 in FIG. 2 are denoted by the same reference signs and the description therefor will be appropriately omitted.

The information processing system 401 is different from the information processing system 101 in that instead of the camera 113, a camera 411 is provided and a CCU (Camera Control Unit) 412 is added.

The camera 411 captures an image under control of the CCU 412 and supplies obtained image data to the CCU 412.

The CCU 412 performs control of the camera 411 and accumulation and transmission of the image data and the like.

By executing, for example, a predetermined application, the PC 112 executes a predetermined fare-paying function. This fare-paying function is, for example, a function to operate the image data accumulated in the CCU 412 by using a graphical user interface (GUI).

This application has a configuration similar to that of the above-described application 301 in FIG. 4. For example, the specific processing execution part 332 causes a PC 112 to execute a communication function with the CCU 412.

Accordingly, in a case where a license is invalid, communication between the PC 112 and the CCU 412 cannot be performed, and as a result, the image data accumulated from the PC 112 to the CCU 412 cannot be operated.

4. EXAMPLE OF INFRINGEMENT DETECTION METHOD OF THE PRESENT TECHNOLOGY

Figure 7:
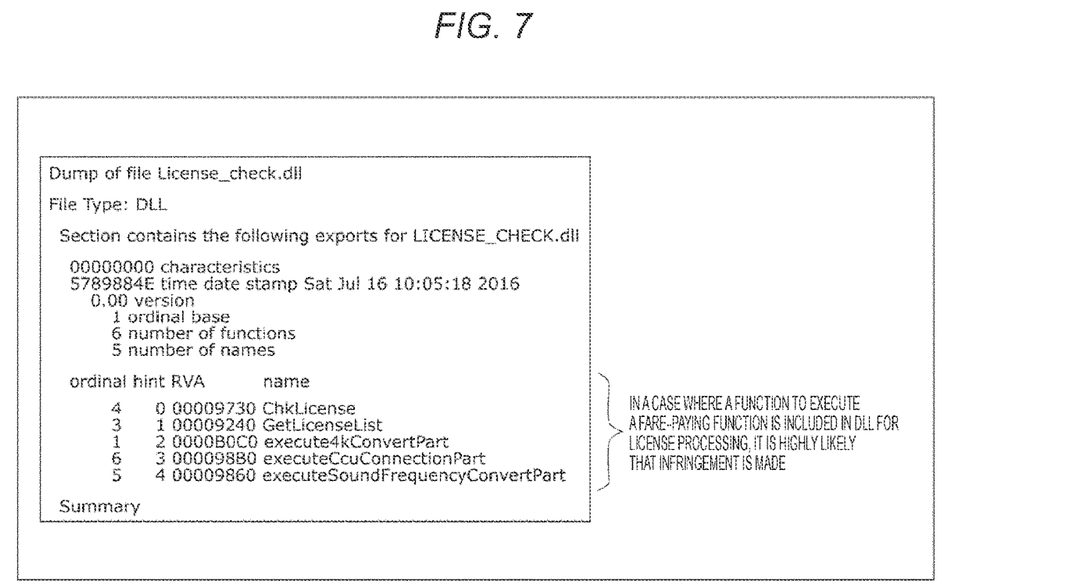
FIG. 7 is a diagram showing an example of an infringement detection method of the present technology.

FIG. 7 shows an example of a dump list, in which a dynamic link library (DLL) for license processing of a fare-paying function is dumped. For example, in a case where a function to execute the fare-paying function is included in this dump list, it is highly likely that the present technology is infringed.

Accordingly, for example, by dumping the library for the license processing of the fare-paying function, there may be a case where infringement of the present technology can be detected.

5. MODIFIED EXAMPLES

Hereinafter, modified examples of the above-described embodiments of the present technology will be described.
<Modified Example Relating to Obfuscation>

A method and a level of obfuscation of a license processing part 331 and a specific processing execution part 332 are set on the basis of, for example, a demanded security level, a processing speed, and the like.

In addition, for example, in a range in which security can be sufficiently ensured, only one part of each of the license processing part 331 and the specific processing execution part 332 may be obfuscated. In addition, one part or all of the license processing part 331 may be obfuscated and no obfuscation may be made for the specific processing execution part 332.

Furthermore, in the range in which the security can be sufficiently ensured, for example, it is also made possible to develop the license processing part 331 and the specific processing execution part 332 in an intermediate language type language, to describe the license processing part 331 and the specific processing execution part 332 in the intermediate language, and to obfuscate the license processing part 331 and the specific processing execution part 332 in a state of the intermediate language.

In addition, for example, one part of a main program 311 may be obfuscated. For example, a start position of the main program 311 may be obfuscated.

Furthermore, for example, security, other than the obfuscation, such as encryption, packing, falsification detection, debug prevention, and the like may be made for the license processing part 331 and the specific processing execution part 332.

<Modified Example Relating to Function Targeted for Protection>

A function to which the present technology is applied is not particularly limited as long as the function is activated by a license, and it also does not matter whether the function is fare-paying or charge-free.

In addition, contents of the specific processing are basically not limited as long as the specific processing is processing of one part of the function which is activated by the license. However, it is preferable that the specific processing is processing in which without any processing result of the specific processing, the function does not normally operate or the function is drastically limited.

Furthermore, for example, the license processing part 331 and the specific processing execution part 332 may share the specific processing.

In addition, for example, the specific processing execution part 332 may execute processing which is required for normal operation of the license processing part 331.

<Modified Example Relating to Structure of Application>

Although in the example in FIG. 4, an example in which the license processing part 331 and the specific processing execution part 332 are separate (for example, as the discrete functions), for example, the license processing part 331 and the specific processing execution part 332 may be integrated.

OTHER MODIFIED EXAMPLES

The present technology can also be applied to an application which operates on an information processing apparatus, other than the PC, such as a smartphone, a mobile phone, a tablet terminal, and a server, for example.

In addition, the present technology can also be applied to a program, other than the application, such as middleware and an operating system.

6. OTHERS

In the present description, a system means a set of a plurality of constituent parts (devices, modules (components), and the like), and it does not matter whether or not all the constituent parts are present in the same one housing. Accordingly, any of a plurality of devices which are housed in discrete housings and are connected via a network and one device in which a plurality of modules is housed in one housing is the system.

Note that an embodiment of the present technology is not limited to the above-described embodiments, and a variety of modifications can be made without departing from the scope of the present technology.

<Combination Example of Configurations>

The present technology can also adopt the following configurations.

(1)
An information processing method including:
a first program causing a computer to execute a function being activated by a license; and
a second program executing license authentication in response to an instruction from the first program, at least one part of the second program being obfuscated, the second program executing one part of the function in a case where the license is valid, and the second program causing the computer to execute processing in which an execution result of the one part of the function is outputted to the first program.

(2)
The information processing method according to the (1), in which
in a case where the license is valid, the second program instructs a third program to execute one part of the function, obtains an execution result of the one part of the function from the third program, and causes the computer to execute processing in which the execution result of the one part of the function is outputted to the first program.

(3)
The information processing method according to the (2), in which
at least one part of the third program is obfuscated.

(4)
The information processing method according to (3), in which
the second program and the third program are described in a machine language.

(5)
The information processing method according to any one of the (2) to (4), in which
the third program is a program which is required for normal operation of the second program.

(6)
The information processing method according to any one of the (2) to (5), in which
the second program causes the computer to execute processing in which an authentication result of the license is further outputted to the first program.

(7)
The information processing method according to the (1), in which
the second program is described in a machine language.

(8)
The information processing method according to any one of the (1) to (7), in which
the first program is described in an intermediate language.

(9)
The information processing method according to the (1), in which
the second program causes the computer to execute processing in which an authentication result of the license is further outputted to the first program.

(10)
A computer-readable recording medium having stored therein a program which including:
a first program which causes a computer to execute a function being activated by a license; and
a second program which executes license authentication in response to an instruction from the first program, at least one part of the second program being obfuscated, executes one part of the function in a case where the license is valid, and causes the computer to execute processing in which an execution result of the one part of the function is outputted to the first program.

Note that effect described in the present description is merely illustrative and not restrictive and there may be other effect.

REFERENCE SIGNS LIST

101 Information processing system
112 PC
201 CPU
301 Application program
311 Main program 312 License processing library
321 Fare-paying function execution part
331 License processing part
332 Specific processing execution part

The invention claimed is:

1. An information processing method, comprising:
in a computer:
executing, by a first program, a function that is activated by a license;
instructing, by the first program, a second program to authenticate the license;
executing, by the second program, license authentication based on the instruction from the first program, wherein at least one part of the second program is obfuscated;
determining, by the second program, the license is valid based on the execution of the license authentication;
executing, by the second program, one part of the function based on the license that is valid; and
executing, by the second program, processing in which an execution result of the one part of the function is outputted to the first program.

2. The information processing method according to claim 1, further comprising:
based on the license that is valid, instructing, by the second program, a third program to execute the one part of the function,
obtaining, by the second program, an execution result of the one part of the function from the third program, and
executing, by the second program, processing in which the execution result of the one part of the function is outputted to the first program.

3. The information processing method according to claim 2, wherein at least one part of the third program is obfuscated.

4. The information processing method according to claim 3, wherein the second program and the third program are described in a machine language.

5. The information processing method according to claim 2, wherein the third program is required for normal operation of the second program.

6. The information processing method according to claim 2, further comprising
executing, by the second program, processing in which an authentication result of the license is outputted to the first program.

7. The information processing method according to claim 1, wherein the second program is described in a machine language.

8. The information processing method according to claim 1, wherein the first program is described in an intermediate language.

9. The information processing method according to claim 1, further comprising
executing, by the second program, processing in which an authentication result of the license is outputted to the first program.

10. A non-transitory computer-readable medium having stored thereon, computer-executable instructions, which when executed by a computer, cause the computer to execute operations, the operations comprising:
executing, by a first program, a function being activated by a license;
instructing, by the first program, a second program to authenticate the license;
executing, by the second program, license authentication based on the instruction from the first program, wherein at least one part of the second program being obfuscated;
determining, by the second program, the license is valid based on the execution of the license authentication;
executing, by the second program, one part of the function based on the license that is valid; and
executing, by the second program, processing in which an execution result of the one part of the function is outputted to the first program.

* * * * *